United States Patent
Yeo et al.

(10) Patent No.: US 7,492,518 B2
(45) Date of Patent: Feb. 17, 2009

(54) APPARATUS FOR TRANSFORMING POLARIZATION AND METHOD THEREOF

(75) Inventors: Yeong-bae Yeo, Daegu (KR); June-koo Rhee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 271 days.

(21) Appl. No.: 11/291,771

(22) Filed: Dec. 2, 2005

(65) Prior Publication Data
US 2006/0119938 A1 Jun. 8, 2006

(30) Foreign Application Priority Data
Dec. 2, 2004 (KR) .................. 10-2004-0100280

(51) Int. Cl.
*G02B 27/28* (2006.01)
(52) U.S. Cl. .................. 359/495; 359/484; 385/11; 398/93
(58) Field of Classification Search .................. None
See application file for complete search history.

(56) References Cited

U.S. PATENT DOCUMENTS

| | | | | |
|---|---|---|---|---|
| 4,071,751 A | * | 1/1978 | Waksberg | 250/201.1 |
| 5,191,387 A | * | 3/1993 | Ichikawa et al. | 356/34 |
| 5,986,784 A | * | 11/1999 | Kersey et al. | 398/152 |
| 7,428,349 B2 | * | 9/2008 | Hainberger et al. | 385/11 |
| 2003/0156776 A1 | * | 8/2003 | Han et al. | 385/11 |
| 2007/0253053 A1 | * | 11/2007 | Suzuki et al. | 359/239 |
| 2007/0280689 A1 | * | 12/2007 | Boffi et al. | 398/65 |

FOREIGN PATENT DOCUMENTS

WO WO 03/014811 A1 * 2/2003
WO WO 2006/027205 A1 * 3/2006

* cited by examiner

*Primary Examiner*—Lee Fineman
(74) *Attorney, Agent, or Firm*—Sughrue Mion, PLLC (57) ABSTRACT

An apparatus for transforming a polarization and a method thereof are provided. The apparatus includes a polarization rotator for rotating a polarization plane of an input optical signal by a specified rotating angle, a polarization beam splitter for dividing the polarization of the optical signal output from the polarization rotator into first and second polarization components, a first monitoring unit for monitoring the first polarization component, a second monitoring unit for monitoring the second polarization component, and a controller for controlling a rotating angle of the polarization rotator so that strengths of the optical signals output from the first and second monitoring unit become equal to each other. Accordingly, a desired polarization component having a constant strength can be obtained by controlling only the rotating angle of the polarization rotator.

9 Claims, 6 Drawing Sheets

APPARATUS FOR TRANSFORMING POLARIZATION AND METHOD THEREOF

This application claims priority from Korean Patent Application No. 2004-100280, filed on Dec. 2, 2004, the entire content of which is incorporated herein by reference.

BACKGROUND OF THE INVENTION

1. Field of the Invention

Apparatuses and methods consistent with the present invention relate to transforming polarization, and more particularly, to transforming a certain incident polarized light into a polarized light having a predetermined polarization condition by controlling only one parameter with respect to the incident polarized light.

2. Description of the Related Art

An apparatus for transforming a light polarization is an apparatus that transforms an input optical signal into an optical signal having a predetermined polarization condition irrespective of the polarization condition of the input optical signal.

Figure 1:
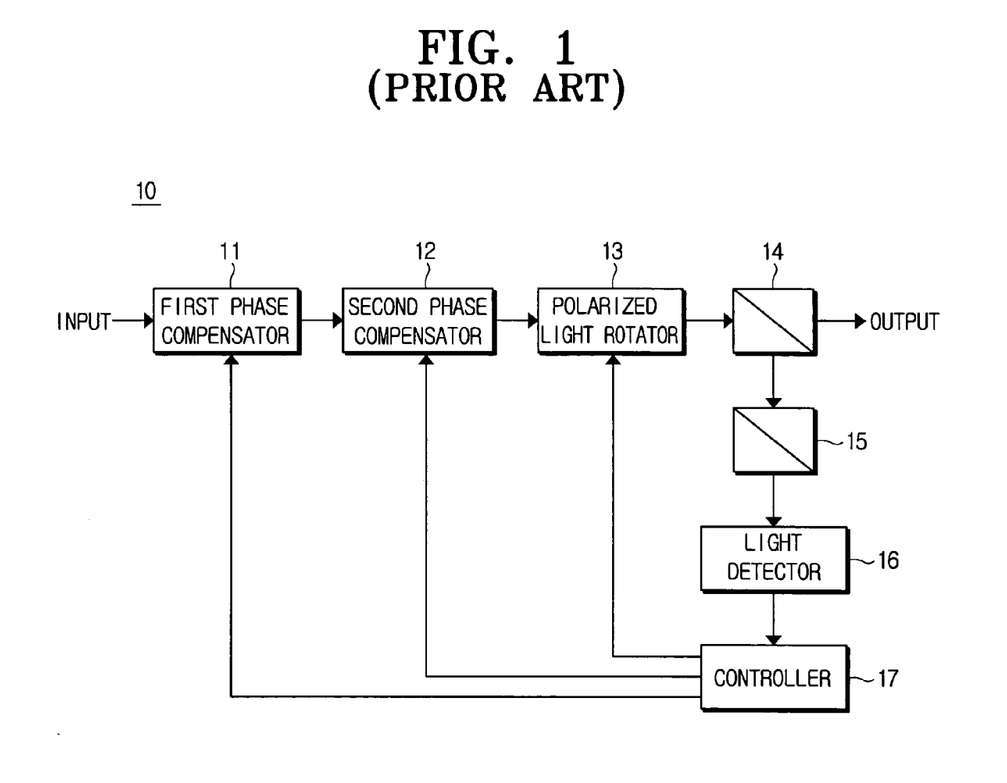
FIG. 1 is a block diagram of a conventional polarization transforming apparatus.

FIG. 1 is a block diagram of a conventional apparatus for transforming a light polarization disclosed in U.S. Pat. No. 5,191,387.

Referring to FIG. 1, the conventional polarization transforming apparatus 10 includes a first phase compensator 11 for compensating for a phase difference with respect to an incident light, a second phase compensator 12 for compensating for a phase difference by 45 degrees with respect to the light output from the first phase compensator 11, a polarized light rotator 13 for rotating a polarization plane of the light output from the second phase compensator 12, a beam splitter 14 for dividing the light of which the polarization plane is rotated, an analyzer 15 for analyzing the light output from the beam splitter 14, an light detector 16 for detecting the light output from the analyzer 15, and a controller 17 for controlling the polarized light rotator 14, the first and second phase compensators 11, 12 in response to the output of the light detector 16.

The polarization transforming apparatus shown FIG. 1 should control three parameters, i.e., a first phase reduction, second phase reduction and rotating angle, in order to continuously transform a certain incident polarized light into a polarized light having a desired polarization condition.

Since most conventional apparatuses for transforming the light polarization, including the apparatus 10 shown in FIG. 1, require many constituent parts and a complicated feedback control circuit in order to transform the incident polarized light into a polarized light having a predetermined polarization condition, their manufacturing costs are greatly increased.

SUMMARY OF THE INVENTION

The present invention provides an apparatus for transforming a polarization and a method thereof that can transform a certain incident polarized light into a polarized light having a constant polarization condition by controlling only the rotating angle of a polarization rotator.

According to an aspect of the present invention, there is provided an apparatus for transforming a polarization, according to the present invention, which comprises a polarization rotator for rotating a polarization plane of an input optical signal by a specified rotating angle, a polarization beam splitter for dividing the polarization of the optical signal output from the polarization rotator into first and second polarization components, a first monitoring unit for monitoring the first polarization component, a second monitoring unit for monitoring the second polarization component, and a controller for controlling a rotating angle of the polarization rotator so that strengths of the optical signals output from the first and second monitoring unit become equal to each other.

The first monitoring unit includes a first beam splitter for dividing the first polarization component and a first beam detector for converting one component divided by the first beam splitter into an electrical signal.

The second monitoring unit includes a second beam splitter for dividing the second polarization component and a second beam detector for converting one component divided by the second beam splitter into an electrical signal.

The controller calculates a relative difference value between strengths of the optical signals output from the first and second monitoring units by a following equation, and control the rotating angle of the polarization rotator based on the calculated difference value between the two optical signals:

$$V \equiv \frac{I_{Det1} - I_{Det2}}{I_{Det1} + I_{Det2}}$$

wherein V denotes the relative difference value between the two optical signals, $I_{Det1}$ the strength of the optical signal output from the first monitoring unit, and $I_{Det2}$ the strength of the optical signal output from the second monitoring unit, respectively.

The controller can control the rotating angle of the polarization rotator until the relative difference value between the two optical signals output from the first and second monitoring units approximates "0" as it performs a dithering of the rotating angle of the polarization rotator.

The polarization rotator may be either a Faraday rotator or a half-wave plate.

According to another aspect of the present invention, there is provided a method of transforming a polarization, which comprises rotating a polarization plane of an input optical signal by a specified rotating angle, dividing the rotated polarization of the optical signal into first and second polarization components, measuring strengths of the optical signals having the first and second polarization components, respectively, and controlling a rotating angle so that the strengths of the optical signals having the first and second polarization components become equal to each other.

The controlling the rotating angle can control the rotating angle based on the relative difference value between the two measured optical signals calculated by a following equation:

$$V \equiv \frac{I_{Det1} - I_{Det2}}{I_{Det1} + I_{Det2}}$$

wherein V denotes the relative difference value between the two optical signals, $I_{Det1}$ the strength of the optical signal having the first polarization component, and $I_{Det2}$ the strength of the optical signal having the second polarization component, respectively.

The controlling the rotating angle can control the rotating angle until the relative difference value between the two optical signals having the first and second polarization components approximates "0" as it performs a dithering of the rotating angle.

BRIEF DESCRIPTION OF THE DRAWINGS

The above and/or other aspects of the present invention will be more apparent by describing exemplary embodiments of the present invention with reference to the accompanying drawings, in which.

DETAILED DESCRIPTION OF THE EXEMPLARY EMBODIMENTS

Certain exemplary embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
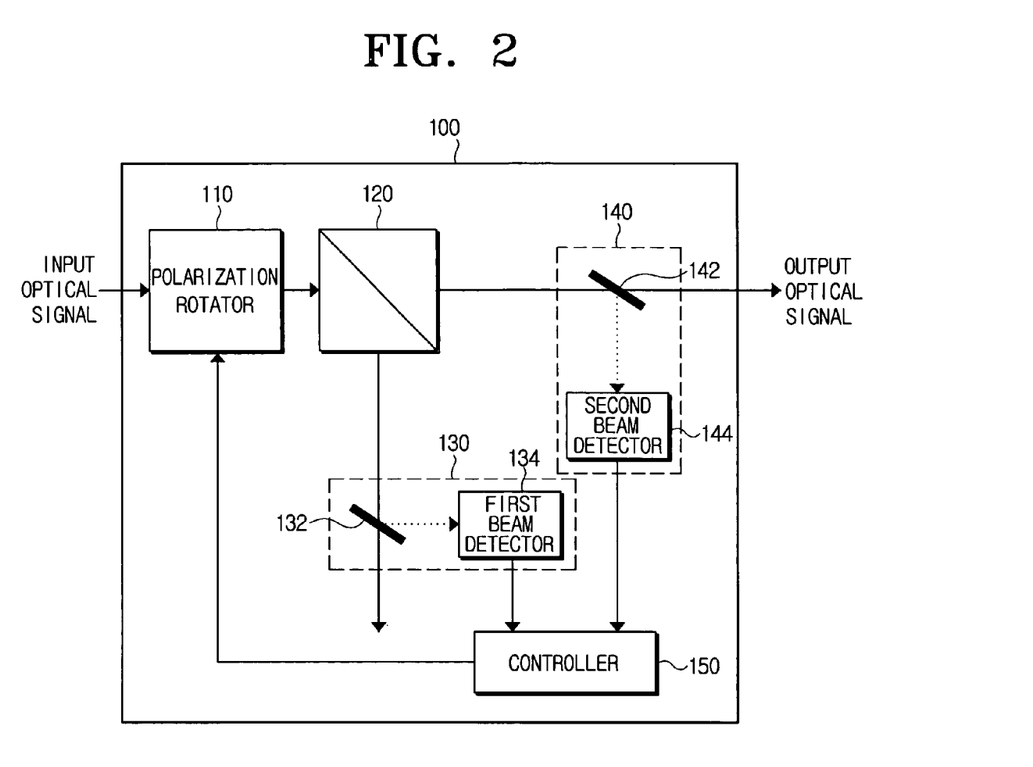
FIG. 2 is a block diagram of a polarization transforming apparatus according to a exemplary embodiment of the present invention.

FIG. 2 is a block diagram of a polarization transforming apparatus according to an exemplary embodiment of the present invention.

As illustrated in FIG. 2, the polarization transforming apparatus 100 according to the exemplary embodiment of the present invention includes a polarization rotator 110, a polarization beam splitter 120, a first monitoring unit 130, a second monitoring unit 140 and a controller 150.

The polarization rotator 110 rotates a polarization plane of an input optical signal emitted from a light source (not illustrated) by a specified rotating angle. The rotating angle and the rotating direction of the polarization rotator 110 are changed from time to time under the control of the controller 150. Preferably, the polarization rotator 110 may be either a Faraday rotator or a half-wave plate.

The polarization beam splitter 120 divides the polarization of the optical signal output from the polarization rotator 110 into first and second polarization components. The typical polarization beam splitter 120 divides the optical signal into an S polarized wave and a P polarized wave, and reflects the S polarized wave while passing the P polarized wave there through. In the exemplary embodiment of the present invention, the S polarized wave is referred to as a first polarization component, and the P polarization component is referred to as a second polarization component.

The first monitoring unit 130 monitors the first polarization component divided by and reflected from the polarization beam splitter 120, and includes a first beam splitter 132 and a first beam detector 134.

The first beam splitter 132 divides the first polarization component into two components and outputs one of the two divided components to the first beam detector 134.

The first beam detector 134 receives and converts the component divided by the first beam splitter 132 into an electrical signal (i.e., a current value or a voltage value), and provides the converted signal to the controller 150. The electrical signal value output from the first beam detector 134 corresponds to the strength of the optical signal having the first polarization component.

The second monitoring unit 140 monitors the second polarization component divided by and reflected from the polarization beam splitter 120, and includes a second beam splitter 142 and a second beam detector 144.

The second beam splitter 142 divides the second polarization component into two components and outputs one of the two divided components to the second beam detector 144. The other of the two divided components divided by the second beam splitter 142 is output to an outside of the polarization transforming apparatus 100 (an output optical signal).

The second beam detector 144 receives and converts the component divided by the second beam splitter 142 into an electrical signal (i.e., a current value or a voltage value), and provides the converted signal to the controller 150. The electrical signal value output from the second beam detector 144 corresponds to the strength of the optical signal having the second polarization component.

The controller 150 controls the rotating angle of the polarization rotator 110 so that the strength of the optical signal output from the first monitoring unit 130, i.e., the first beam splitter 132 and the first beam detector 134, becomes equal to the strength of the optical signal output from the second monitoring unit 140, i.e., the second beam splitter 142 and the second beam detector 144.

The controller 150 calculates the relative difference value between the optical signal output from the first beam detector 134 and the optical signal output from the second beam detector 144 by Equation (1), and controls the rotating angle of the polarization rotator 110 based on the calculated difference value:

$$V \equiv \frac{I_{Det1} - I_{Det2}}{I_{Det1} + I_{Det2}} \qquad (1)$$

wherein V denotes the relative difference value between the two optical signals, $I_{Det1}$ the strength of the optical signal output from the first beam detector 134, and $I_{Det2}$ the strength of the optical signal output from the second beam detector 144, respectively.

The controller 150 calculates the relative difference value between the strengths of the optical signals having the first and second polarization components by Equation (1) with respect to the optical signals being continuously input in process of time, and continuously performs a feedback control of the rotating direction and the rotating angle of the polarization rotator 110 based on the sign and the size of the calculated difference value.

Although it is ideal that the relative difference value between the strengths of the optical signals having the first and second polarization components becomes "0", it cannot be "0" in practice, and the controller 150 continuously performs the feedback control of the rotating angle of the polarization rotator 110 until the difference value between the strengths of the two optical signals having the first and second polarization components approximates "0".

Additionally, the controller 150 continuously calculates the relative difference value of the strengths of the optical signals having the first and second polarization components with respect to the input optical signals as it performs a dithering of the rotating angle of the polarization rotator 110, and performs the feedback control of the rotating angle of the polarization rotator 110 until the calculated relative difference value between the strengths of the two optical signals having the first and second polarization components approximates "0".

For example, if it is desired that the relative difference value between the strengths of the optical signals having the first and second polarization components becomes ±0.01 and less, the controller 150 controls the rotating angle of the polarization rotator 110 with a precision of ±0.3°, while if it is desired that the relative difference value between the strengths of the optical signals having the first and second polarization components becomes ±0.05 and less, the controller 150 controls the rotating angle of the polarization rotator 110 with a precision of ±1.4°.

As an example of determining the rotating angle of the polarization rotator 110, the controller 150 can determine the rotating angle β of the polarization rotator by Equations (2) to (4) based on the strength of the optical signal output from the first beam detector 134 and the strength of the optical signal output from the second beam detector 144.

$$I_{Det1} = \frac{I_O}{2}[1 + \cos[2(\alpha + \beta]\cos(2\theta)] \quad (2)$$

$$I_{Det2} = \frac{I_O}{2}[1 - \cos[2(\alpha + \beta]\cos(2\theta)] \quad (3)$$

$$I_{Det1} = I_{Det2} = \frac{I_O}{2} \quad (4)$$

Here, $I_{Det1}$ denotes the strength of the optical signal output from the first beam detector 134, $I_{Det2}$ the strength of the optical signal output from the second beam detector 144, and $I_O$ the sum of $I_{Det1}$ and $I_{Det2}$, respectively. Also, α and θ denote parameters that indicate the polarization conditions of the input optical signals.

Figure 3:
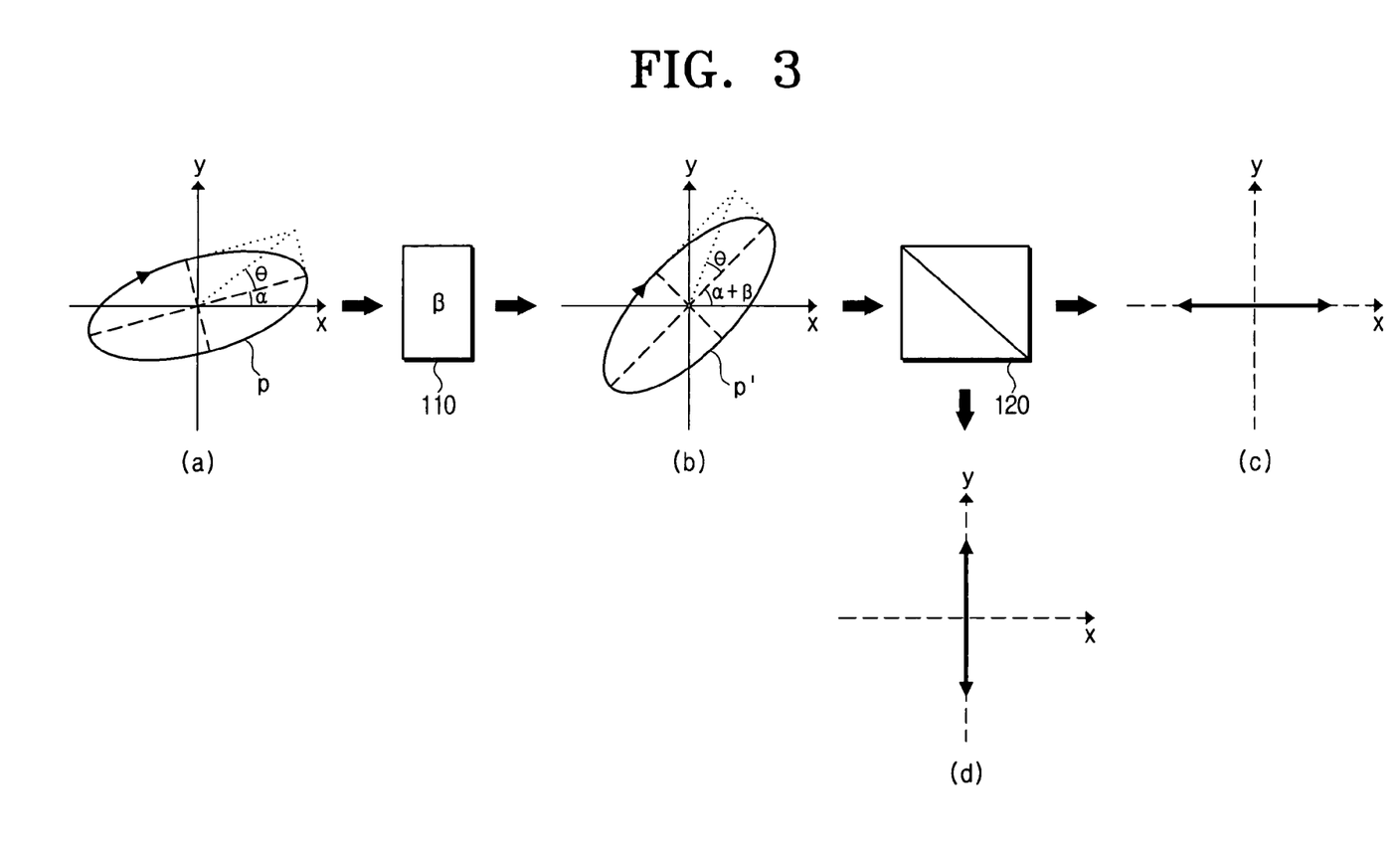
FIG. 3 is a view explaining the principle of an angle control of an incident light.

FIG. 3 is a view explaining the principle of an angle control of an incident light. Referring to FIG. 3, the controller 150 performs the feedback control of the rotating angle of the polarization rotator 110, so that the two output optical signals have the same strength.

As illustrated in (a) of FIG. 3, it is assumed that an optical signal having a certain polarization component P is incident at a certain angle α to the x axis based on the major axis. Also, α and θ are parameters that indicate the polarization component P, and θ corresponds to the ellipticity.

If an optical signal having a certain polarization component P is incident to the polarization rotator 110, the polarization rotator 110 rotates the polarization component P by an angle of β and outputs the rotated polarization component P. As illustrated in (b) of FIG. 3, the polarization component P is converted by the polarization rotator 110 into a polarization component P' having an angle of α+β to the x axis based on the major axis.

If the polarization component P' as illustrated in (b) of FIG. 3 is incident to the polarization beam splitter 120, it is divided into two orthogonal polarization components, i.e., the first and second polarization components.

As illustrated in (c) and (d) of FIG. 3, the first polarization component and the second polarization component output from the polarization beam splitter 120 appear as linear polarization components in horizontal and vertical directions, respectively, with the same size (i.e., strength).

Figure 4:
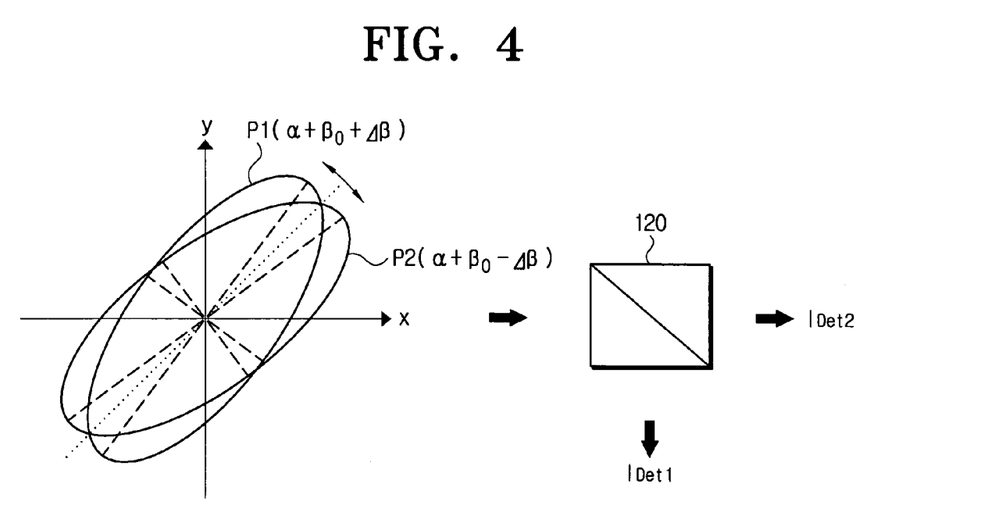
FIG. 4 is a view explaining a method for a feedback control of the rotating angle of a polarization rotator.

FIG. 4 is a view explaining a method for the feedback control of the rotating angle of the polarization rotator. With reference to FIG. 4, the method for the feedback control of the rotating angle of the polarization rotator 110 as performing a dithering of the rotating angle of the polarization rotator 110 under the control of the controller 150 will now be explained in detail.

If a certain polarized light having an angle of α to the x axis is incident to the polarization rotator 110, the polarization rotator 110 rotates the polarized light by $β_0$, and then performs the dithering of the rotating angle within the amplitude of Δβ centering around the rotated angle. As a result, the polarization of the light having passed through the polarization rotator 110 periodically vibrates between points P1 and P2 having angles of $α+β_0+Δβ$ and $α+β_0-Δβ$, respectively.

If this light is incident to the polarization beam splitter 120, the first polarization component and the second polarization component which are orthogonal to each other are output from the polarization beam splitter 120. As illustrated in FIG. 2, the first and second polarization components are detected by the first beam detector 134 and the second beam detector 144 as electrical signal values of $I_{Det1}$ and $I_{Det2}$.

If it is assumed that the rotating angle of the polarization rotator 110 before the feedback control is $β_0$, the rotating angle of the polarization rotator 110 for the feedback control is $β_{error}$, the dithering amplitude of the rotating angle is Δβ, and the rotating angle after the feedback control is $β_0'$, the difference value $V_±$ of the strengths of the two optical signals is calculated by Equations (5) to (7).

$$I_{Det1}^{±} = \frac{I_O}{2}[1 + \cos[2(\alpha + β_0 ± Δβ]\cos(2\theta)] \quad (5)$$

$$I_{Det2}^{±} = \frac{I_O}{2}[1 - \cos[2(\alpha + β_0 ± Δβ]\cos(2\theta)] \quad (6)$$

$$V_± \equiv \frac{I_{Det1}^{±} - I_{Det2}^{±}}{I_{Det1}^{±} + I_{Det2}^{±}} = \cos[2(\alpha + β_0 ± Δβ]\cos(2\theta) \quad (7)$$

The controller 150 performs the feedback control of the rotating angle of the polarization rotator 110 based on the difference value between the strengths of the two optical signals calculated by Equation (7). Specifically, the feedback control value of the rotating angle of the polarization rotator 110 is calculated from the values of $I_{Det1}$ and $I_{Det2}$ calculated by Equations (5) and (6) and the change of the value $V_±$ calculated by Equation (7).

At this time, $β_{error}$ can be calculated by Equations (8) and (9) based on the value $V_±$ calculated by Equation (7), and the controller 150 converts $β_0$ into $β_0'$ by compensating for the polarization rotating angle of the polarization rotator by $β_{error}$ using Equation (10).

$$\frac{V_+ + V_-}{V_+ - V_-} = \frac{\tan(2b_{error})}{\tan(2Δβ)} \text{ wherein } \alpha + \beta \equiv \frac{\pi}{4} + β_{error} \quad (8)$$

$$β_{error} = \frac{1}{2}\tan^{-1}\left[2Δβ\left(\frac{V_+ + V_1}{V_+ - V_-}\right)\right] : Δβ = <<1 \quad (9)$$

$$β_0' = β_0 - β_{error} \quad (10)$$

Figure 5A:
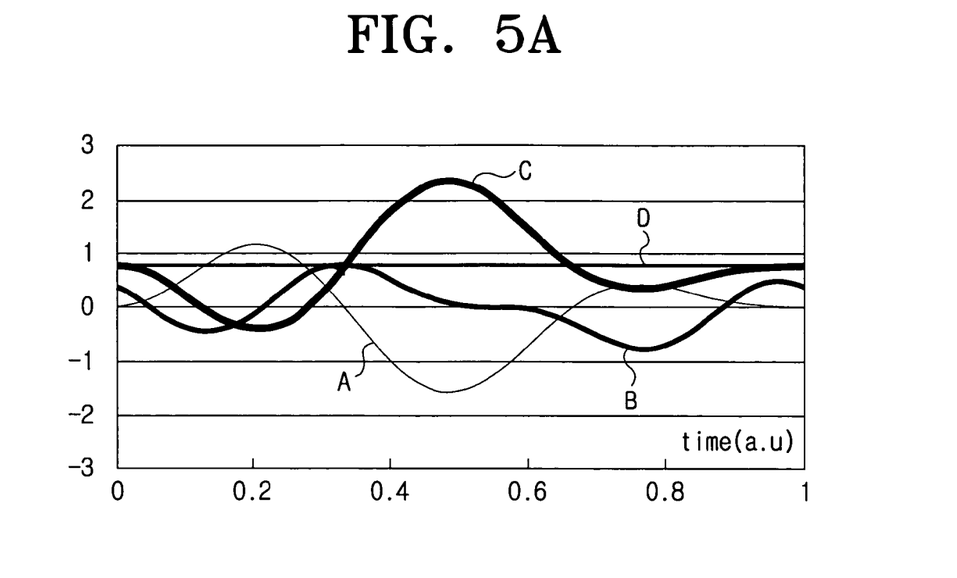
FIGS. 5A and 5B are graphs explaining the method for a feedback control of the rotating angle of a polarization rotator.
Figure 5B:
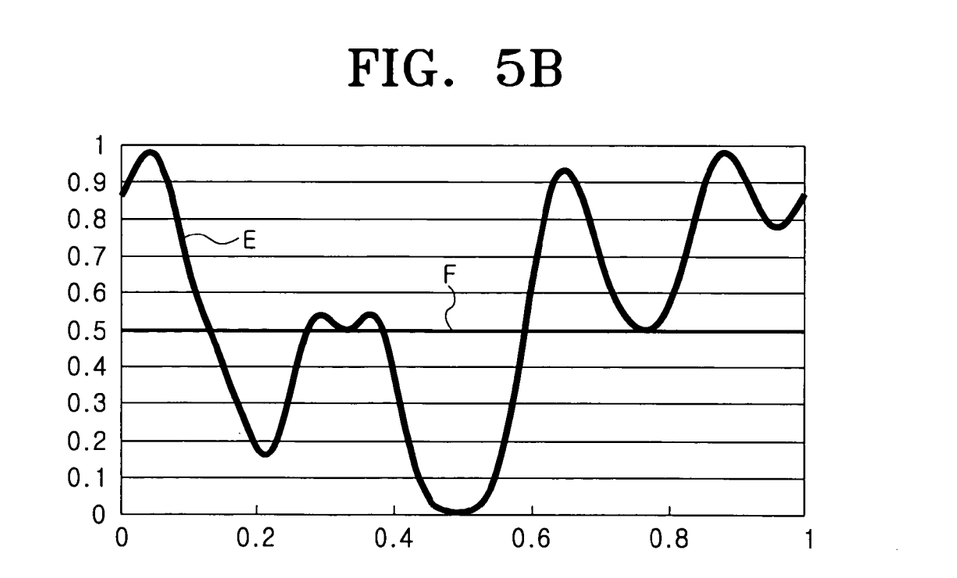

FIGS. 5A and 5B are graphs explaining the method for the feedback control of the rotating angle of the polarization rotator. FIGS. 5A and 5B illustrate that several parameters of $\alpha$, $\beta_0$, $\alpha+\beta_0$ and $I_{out}/I_0$ for the polarization components P1 and P2 as illustrated in FIG. 4 are continuously changed with the lapse of time.

Referring to FIG. 5A, it can be recognized that $\alpha$(A), $\theta$(B) and $\beta_0$(C) are parameters being continuously changed with the lapse of time. If the controller 150 performs the feedback control of them, $\alpha$(A) and $\beta_0$(C) are added together to produce a constant value ($\alpha+\beta_0(\pi/4)$) as illustrated as a graph D in FIG. 5A.

FIG. 5B illustrates the ratio $I_{out}/I_0$ of the output value $I_{out}$ of the second beam splitter 142 to the sum ($I_0=I_{Det1}+I_{Det2}$) of the output value $I_{Det1}$ of the first beam detector 134 and the output value $I_{Det2}$ of the second beam detector 144 in accordance with the parameters $\alpha$(A), $\theta$(B) and $\beta_0$(C). If the feedback control is not performed, the variation rate becomes great with the lapse of time as illustrated as a graph E in FIG. 5B.

Meanwhile, if the feedback control is performed with respect to the graph E having the great variation rate with the lapse of time as explained with reference to FIGS. 2 to 4, the ratio $I_{out}/I_0$ is kept constant with the lapse of time as illustrated as a graph F in FIG. 5B.

As described above, the polarization transforming apparatus 100 according to the present invention aims at the polarization control itself, and can obtain an output optical signal having a predetermined polarization condition and a constant strength by continuously controlling the condition of the polarization rotator 110 according to the change of the polarization component of the input optical signal.

The polarization transforming apparatus 100 according to the present invention transforms the polarization component of the input optical signal into a predetermined polarization component. Accordingly, the optical element that depends upon the input polarized light can operate irrespective of the input polarized light.

For example, a wavelength conversion apparatus proposed by Hark Yoo et al., "All-Optical Wavelength Conversion Using Absorption Modulation of an Injection-Locked Fabry-Perot Laser Diode," IEEE Photonics Technology Letters, February 2004, has a drawback in that it operates with respect to a specified input polarized light only.

However, if the above-described wavelength conversion apparatus is combined with the polarization transforming apparatus 100 according to the present invention, it will be able to operate irrespective of the input polarized light with the utility improved.

Figure 6:
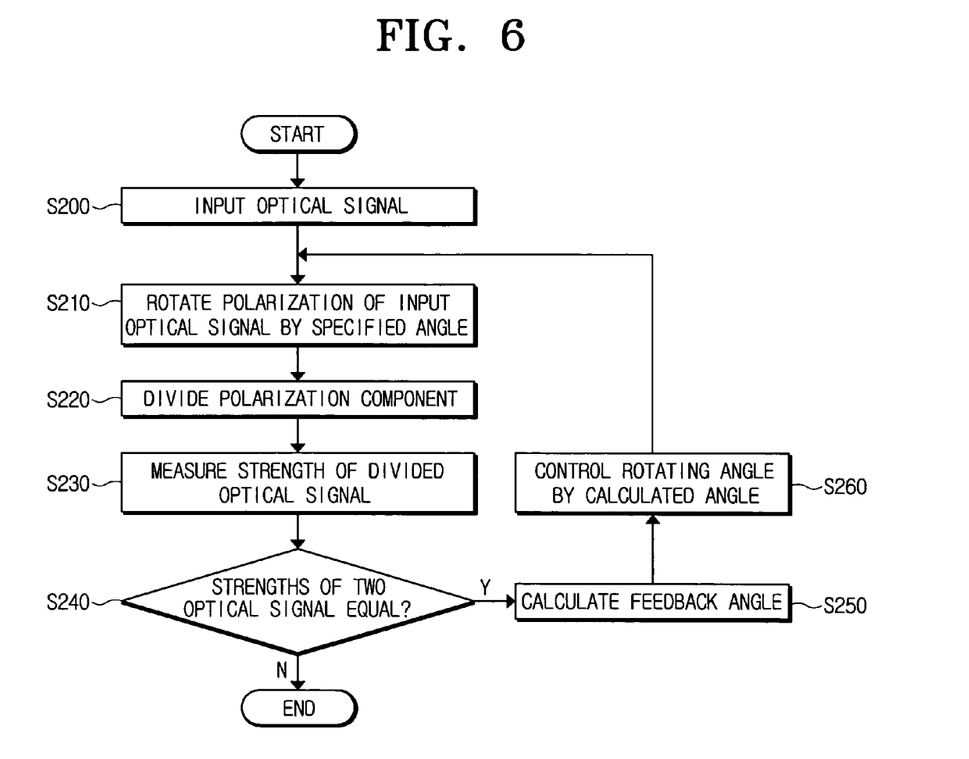
FIG. 6 is a flowchart illustrating a polarization transforming method according an exemplary embodiment to the present invention.

FIG. 6 is a flowchart illustrating a polarization transforming method according to an exemplary embodiment of the present invention. Hereinafter, the polarization transforming method according to the present invention will be explained in detail with reference to FIGS. 2 to 6.

If an optical signal having a certain polarization is input to the polarization rotator 110, the polarization rotator 110 rotates the polarization plane of the input optical signal by a specified rotating angle (operations S200 and S210).

The optical signal of which the polarization plane is rotated by the polarization rotator 110 is input to the polarization beam splitter 120, and divided into an optical signal having the first polarization component and an optical signal having the second polarization component by the polarization beam splitter 120 (operation S220).

The optical signal having the first polarization component is monitored through the first beam splitter 132 and the first beam detector 134, and the optical signal having the second polarization component is monitored through the second beam splitter 132 and the second beam detector 144. The strengths of the two optical signals measured by the first beam detector 134 and the second beam detector 144 are input to the controller 150 (operation S230).

The controller 150 judges whether the strengths of the two optical signals input from the first beam detector 134 and the second beam detector 144 are equal to each other (operation S240). If the strengths of the two optical signals are equal to each other, a desired polarization component having a constant strength can be obtained.

If the strengths of the two optical signals are not equal to each other at operation S240, the controller 150 calculates the feedback angle of the polarization rotator 110 (operation S250), and controls the rotating angle of the polarization rotator 110 by the calculated angle (operation S260). Here, the feedback control of the rotating angle of the polarization rotator 110 is performed in the same manner as described above.

As described above, according to the polarization transforming apparatus and method according to the present invention, by controlling only the rotating angle of the polarization rotator 150, a certain input polarized light is transformed into a predetermined polarized light through a simple feedback control circuit without restriction by the condition of the input polarization component.

Then, the incident light having passed through the polarization rotator 150 is divided into two lights having the same strength by the polarization beam splitter 120, and thus the output light has a constant strength in proportion to the strength of the input light.

Additionally, a continuous polarization transform is possible since no reset operation is necessary during the operation of the polarization transforming apparatus, and the construction and the control circuit of the polarization transforming apparatus is simplified with its manufacturing cost reduced.

The foregoing exemplary embodiment and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An apparatus for transforming a polarization, the apparatus comprising:
   a polarization rotator which rotates a polarization plane of an input optical signal by a specified rotating angle;
   a polarization beam splitter which divides a polarization of an optical signal output from the polarization rotator into first and second polarization components;
   a first monitoring unit which monitors the first polarization component and outputs a first optical signal;
   a second monitoring unit which monitors the second polarization component and outputs a second optical signal; and
   a controller which, if the strengths of the first and second optical signals are not equal to each other, controls a rotating angle of the polarization rotator so that the strengths of the first and second optical signals output from the first and second monitoring units become equal to each other.

2. The apparatus as claimed in claim 1, wherein the first monitoring unit comprises:
   a first beam splitter which divides the first polarization component into first and second components; and
   a first beam detector which converts the first component into an electrical signal which is output to the controller.

3. The apparatus as claimed in claim 1, wherein the second monitoring unit comprises:
- a second beam splitter which divides the second polarization component into first and second components; and
- a second beam detector which converts the first component into an electrical signal which is output to the controller.

4. The apparatus as claimed in claim 1, wherein the controller calculates a relative difference value V between the strengths of the first and second optical signals output from the first and second monitoring units by a following equation:

$$V \equiv \frac{I_{Det1} - I_{Det2}}{I_{Det1} + I_{Det2}}$$

where IDet1 denotes the strength of the first optical signal output from the first monitoring unit, and IDet2 denotes the strength of the second optical signal output from the second monitoring unit, and
wherein the controller controls the rotating angle of the polarization rotator based on the calculated difference value between the first and second optical signals.

5. The apparatus as claimed in claim 1, wherein the controller controls the rotating angle of the polarization rotator so that the relative difference value between the first and second optical signals output from the first and second monitoring units approximates zero while performing a dithering of the rotating angle of the polarization rotator.

6. The apparatus as claimed in claim 1, wherein the polarization rotator is one of a Faraday rotator and a half-wave plate.

7. A method of transforming a polarization, the method comprising:
- rotating a polarization plane of an input optical signal by a specified rotating angle;
- dividing the optical signal having the rotated polarization plane into a first optical signal having a first polarization component and a second optical signal having a second polarization component;
- measuring strengths of the first and second optical signals having the first and second polarization components, respectively; and
- if the strengths of the first and second optical signals are not equal to each other, controlling a rotating angle so that the strengths of the first optical signal having the first polarization component and the second optical signal having the second polarization component become equal to each other.

8. The method as claimed in claim 7, wherein the controlling the rotating angle controls the rotating angle based on a relative difference value V between the first and second optical signals calculated by a following equation:

$$V \equiv \frac{I_{Det1} - I_{Det2}}{I_{Det1} + I_{Det2}}$$

wherein IDet1 denotes the strength of the first optical signal having the first polarization component, and IDet2 denotes the strength of the second optical signal having the second polarization component.

9. The method as claimed in claim 7, wherein the controlling the rotating angle controls the rotating angle so that a relative difference value between the first and second optical signals having the first and second polarization components, respectively, approximates zero while performing a dithering of the rotating angle.

* * * * *